(12) United States Patent
Hui et al.

(10) Patent No.: US 9,654,389 B2
(45) Date of Patent: May 16, 2017

(54) ORDER-SENSITIVE COMMUNICATIONS IN PACKET REORDERING NETWORKS

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 14/576,873

(22) Filed: Dec. 19, 2014

(65) Prior Publication Data

US 2016/0021018 A1    Jan. 21, 2016

Related U.S. Application Data

(60) Provisional application No. 62/026,972, filed on Jul. 21, 2014.

(51) Int. Cl.
| | |
|---|---|
| *H04L 12/721* | (2013.01) |
| *H04L 12/863* | (2013.01) |
| *H04L 12/707* | (2013.01) |
| *H04L 12/891* | (2013.01) |
| *H04L 12/833* | (2013.01) |
| *H04L 12/801* | (2013.01) |
| H04L 12/753 | (2013.01) |
| H04L 12/705 | (2013.01) |

(52) U.S. Cl.
CPC .............. *H04L 45/38* (2013.01); *H04L 45/22* (2013.01); *H04L 45/24* (2013.01); *H04L 47/31* (2013.01); *H04L 47/34* (2013.01); *H04L 47/41* (2013.01); *H04L 47/624* (2013.01); *H04L 45/18* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 7,035,214 B1 * | 4/2006 | Seddigh | ............... H04L 1/1635 370/231 |
| 7,508,840 B2 | 3/2009 | Delaney | |

(Continued)

OTHER PUBLICATIONS

International Search Report dated Oct. 20, 2015 in connection with PCT/US2015/040261.

(Continued)

*Primary Examiner* — Gary Mui
(74) *Attorney, Agent, or Firm* — Parker Ibrahim & Berg LLC; James M. Behmke; Robert M. Amici

(57) ABSTRACT

In one embodiment, a device in a network determines that a particular packet flow in the network is sensitive to packet reordering. The device determines whether a particular packet of the packet flow is to be routed differently than an immediately prior packet in the packet flow, in response to determining that the particular packet flow is sensitive to reordering. The device marks the particular packet as taking a different route than the immediately prior packet in the packet flow, prior to forwarding the marked packet and in response to determining that the particular packet is to be routed differently than the immediately prior packet in the packet flow.

23 Claims, 16 Drawing Sheets

(56) References Cited

U.S. PATENT DOCUMENTS

| | | | |
|---|---|---|---|
| 8,111,649 | B1 | 2/2012 | Agarwall et al. |
| 8,553,688 | B2 | 10/2013 | Vasseur et al. |
| 8,582,481 | B2 | 11/2013 | Kim et al. |
| 2009/0168723 | A1 | 7/2009 | Meylan |
| 2014/0169383 | A1* | 6/2014 | Jain .......................... H04L 45/22 370/412 |

OTHER PUBLICATIONS

Wang, F. et al: "Improving TCP Performance Over Mobile Ad-hoc Networks with Out-of-Order Detection and Response," MOBIHOC 2002, Proceedings of the 3rd ACM International Symposium on Mobile Ad Hoc Networking and Computing, Lausanne, Switzerland, Jun. 9-11, 2002, pp. 217-225.

Gnawali, et al., "The Minimum Rank with Hysteresis Objective Function", Request for Comments 6719, Sep. 2012, 13 pages, Internet Engineering Task Force Trust.

Thubert P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter, et al., "RPL: IPv6 Routing Protocol for Low-Power and Lossy Networks", Request for Comments 6550, Mar. 2012, 157 pages, Internet Engineering Task Force Trust.

* cited by examiner

ORDER-SENSITIVE COMMUNICATIONS IN PACKET REORDERING NETWORKS

RELATED APPLICATIONS

This application claims priority to U.S. Provisional Application No. 62/026,972, filed Jul. 21, 2014, entitled: "ORDER-SENSITIVE COMMUNICATIONS IN PACKET REORDERING NETWORKS," by Hui et al., the contents of which are herein incorporated by reference.

TECHNICAL FIELD

The present disclosure relates generally to computer networks, and, more particularly, to order-sensitive communications in packet reordering networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location may be a smart meter that communicates wirelessly and/or using the electrical power distribution line itself as a communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
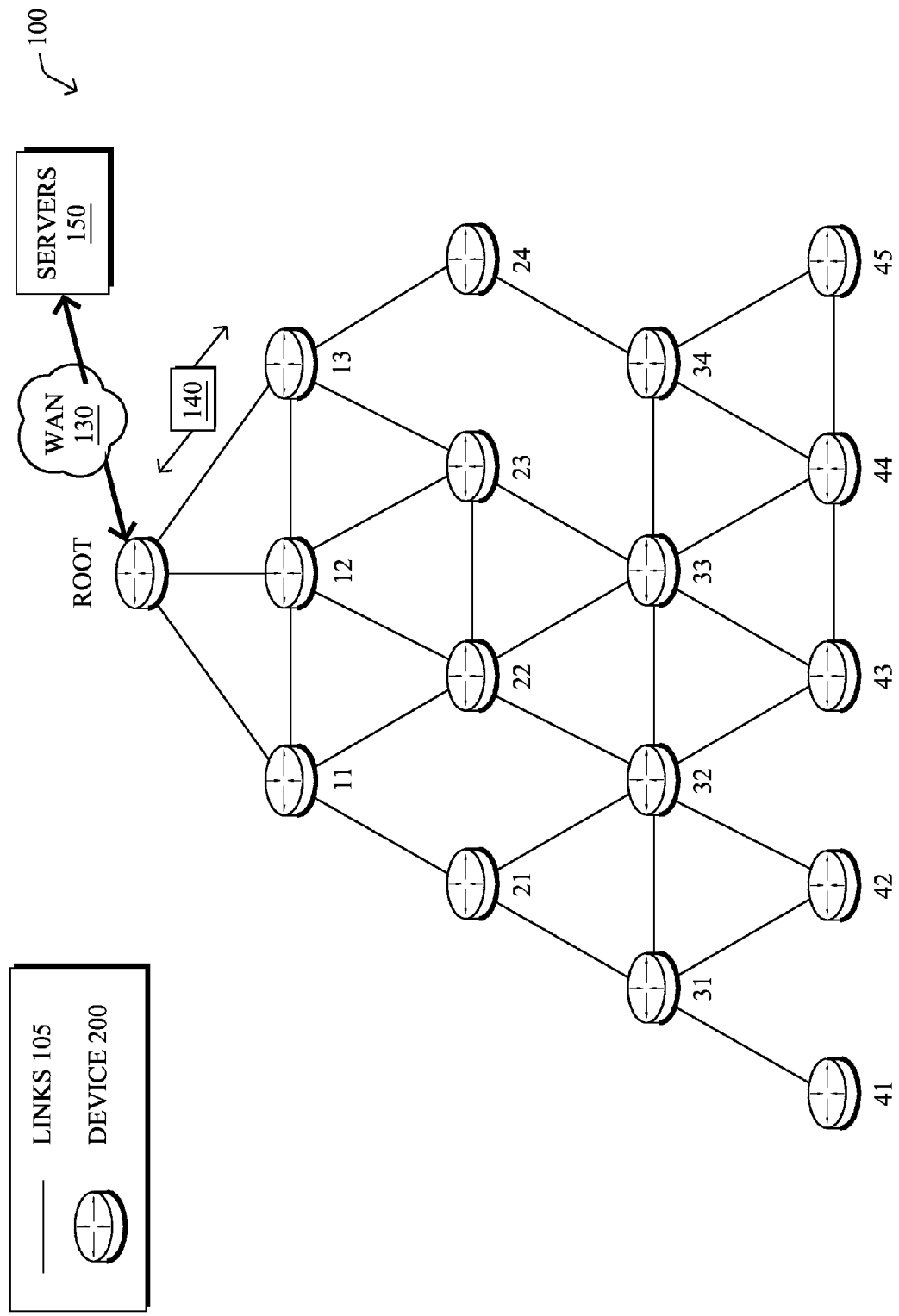
FIG. 1 illustrates an example communication network.

According to one or more embodiments of the disclosure, a device in a network determines that a particular packet flow in the network is sensitive to packet reordering. The device determines whether a particular packet of the packet flow is to be routed differently than an immediately prior packet in the packet flow, in response to determining that the particular packet flow is sensitive to reordering. The device marks the particular packet as taking a different route than the immediately prior packet in the packet flow, prior to forwarding the marked packet and in response to determining that the particular packet is to be routed differently than the immediately prior packet in the packet flow.

In further embodiments, a device in a network determines that a particular packet flow is sensitive to packet reordering. The device determines whether a particular packet of the packet flow received by the device is marked as having been routed differently than a previously received packet of the packet flow, in response to determining that the packet flow is sensitive to packet reordering. The device buffers and delays the particular packet until either one or more out-of-order packets of the packet flow are received by the device subsequent to receiving the particular packet or upon expiration of a timeout period, in response to determining that the particular packet is marked as having been routed differently than the previously received packet of the packet flow. The device forwards all buffered packets of the packet flow in sequential order.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. The illustrative root node, such as a field area router (FAR), may interconnect the local networks with a WAN 130, which may enable communication with other relevant devices such as management devices or servers 150, e.g., a network management server (NMS), a dynamic host configuration protocol (DHCP) server, a constrained application protocol (CoAP) server, an outage management system (OMS), a supervisory control and data acquisition (SCADA) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
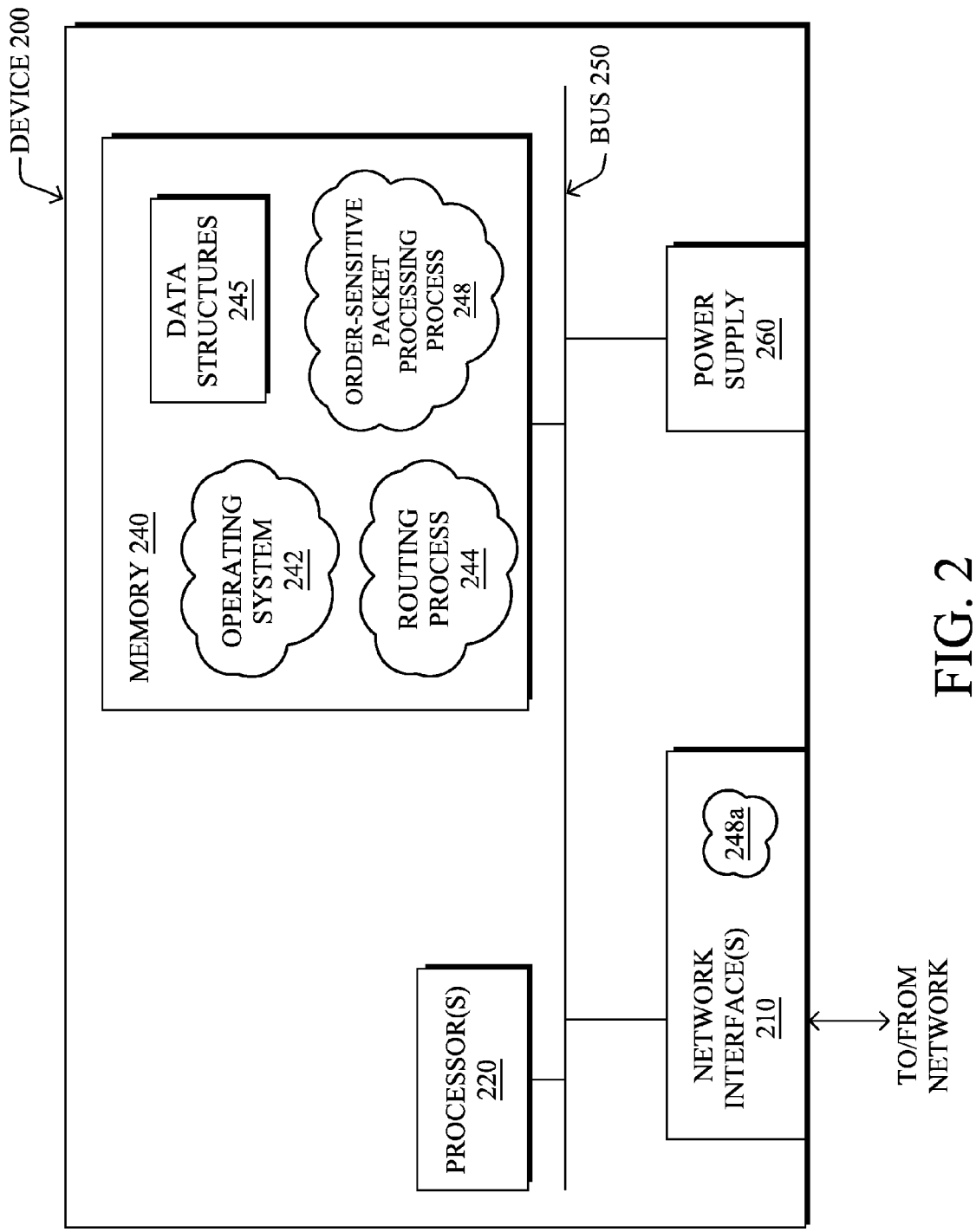
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "order-sensitive packet processing" process 248, which may be configured depending upon the particular node/device within the network 100 with functionality ranging from intelligent learning machine processes to merely communicating with intelligent learning machines, as described herein. Note also that while the order-sensitive packet processing process 248 is shown in centralized memory 240, alternative embodiments provide for the process to be specifically operated within the network interfaces 210 (e.g., "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by a DAG process) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks"<RFC 6551> by Vasseur, et al. (March 2012 version). Further, an example OF (e.g., a default OF) may be found in an IETF RFC, entitled "RPL Objective Function 0"<RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
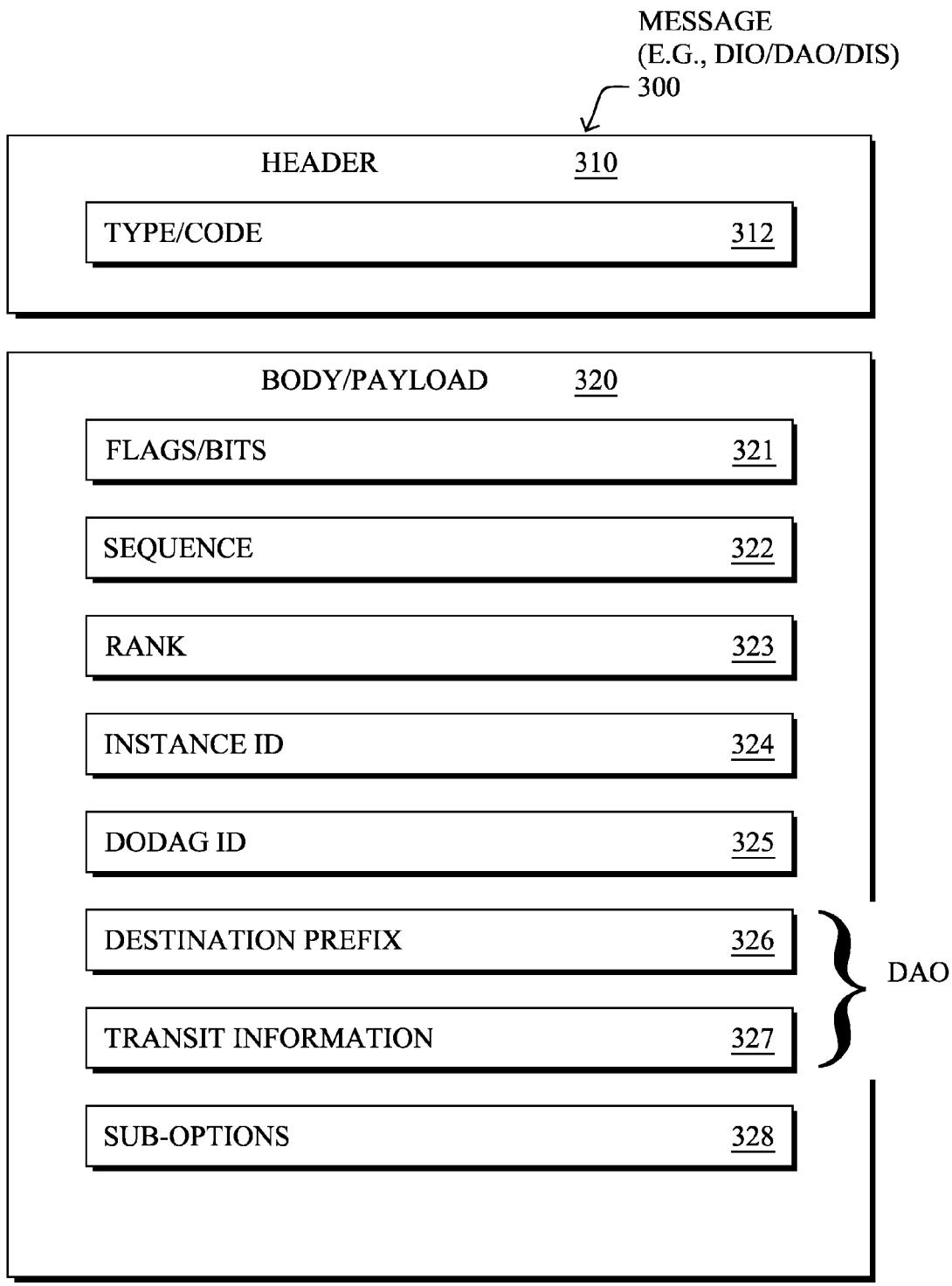
FIG. 3 illustrates an example routing protocol message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
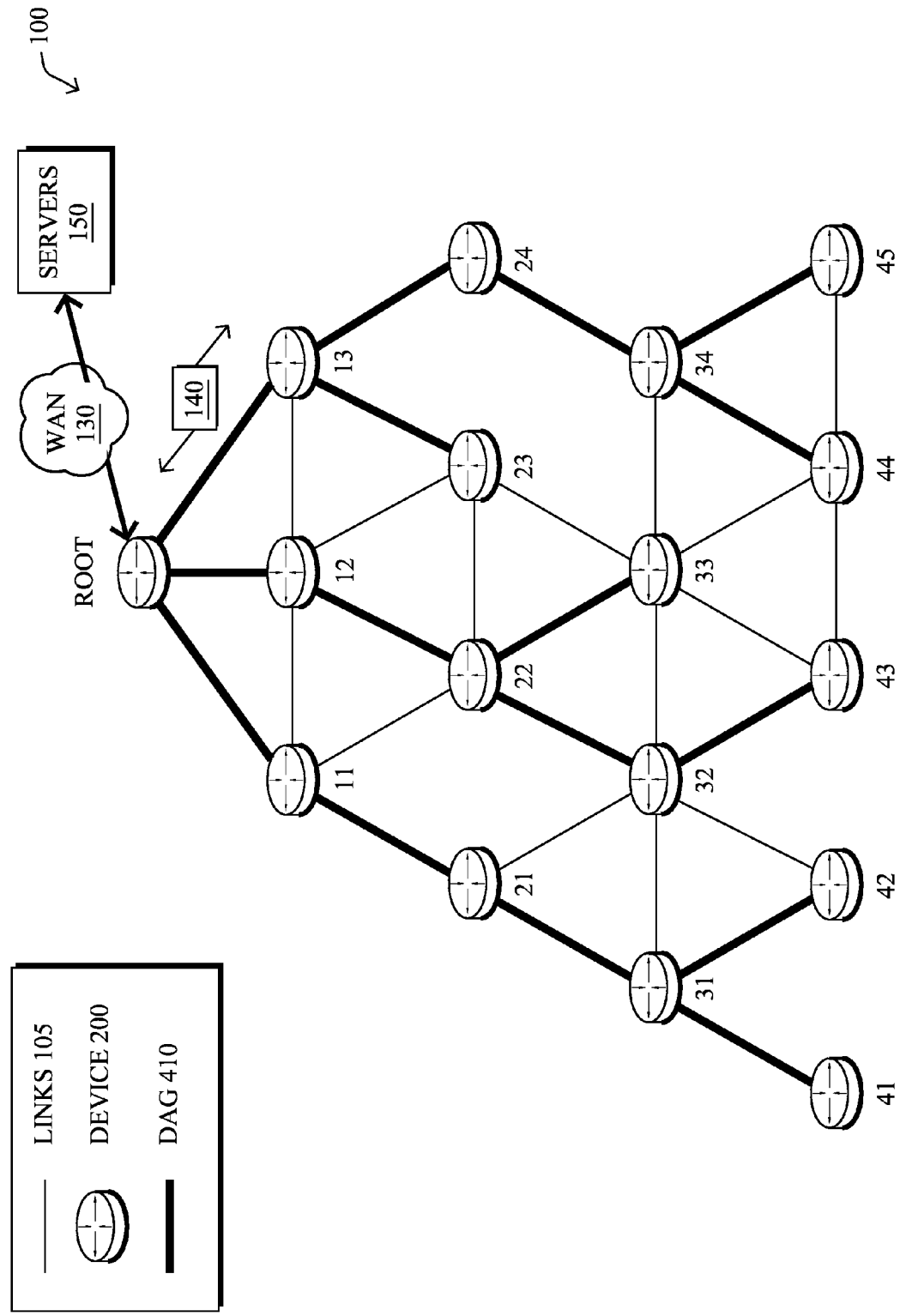
FIG. 4 illustrates an example directed acyclic graph (DAG) in the network.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, Smart Grid AMI represents one potential use for LLNs. Initially, Smart Grid AMI implementations focused on supporting Automated Meter Reading (AMR) applications. However, the market is quickly turning towards supporting additional applications using the same Smart Grid AMI infrastructure. For example, Distribution Automation (DA) is another application that may be supported by extending Smart Grid AMI infrastructure to communicate with DA devices.

Existing DA devices typically communicate using SCADA protocols, such as the Distributed Network Protocol 3 (DNP3) and the like. In addition, many existing DA devices communicate using serial communications (e.g., RS-232, RS-485, etc.). Some DA devices may communicate using Ethernet, typically encapsulating the serial communication in TCP or UDP frames. Thus, a router in communication with a DA device may be operable to encapsulate and forward SCADA traffic across the mesh to a backend SCADA server. In the case of connecting a DA device to the mesh, the router may encapsulate the serial traffic in TCP or UDP frames and forward them across the mesh (e.g., towards an egress router that decapsulates the frames, etc.). In another example, in the case of connecting a DA device to the mesh via Ethernet, the router may simply forward the TCP or UDP packets across the mesh, while performing any needed translations (e.g., MAP-T, etc.).

SCADA protocols typically do not tolerate reordering. Notably, many SCADA protocols were originally designed with serial communication in mind. Consequently, many SCADA protocols typically assume that a stream of bytes transmitted by a first device will always be received in the same ordering by another device in which they were sent. When bytes are received out of order, the receiver will typically discard the out-of-order packet, leading to a potential failure in the communication.

Unlike traditional SCADA implementations, many LLN protocols increase the likelihood of out-of-order packets being received by a device. Notably, many of the forwarding mechanisms developed for LLNs take into account the limited and often changing conditions of an LLN. For example, link-layer retransmission, multiple next-hop routes to a destination, and receiver diversity are all mechanisms widely used in LLNs to improve throughput, latency, and the robustness of communications. Use of these mechanisms, however, can also lead to packets being received out of order (e.g., by sending packets of a flow along different routing paths, etc.). Accordingly, it still remains challenging and difficult to extend Smart Grid AMI mesh networks and other LLNs to support communications between DA devices and other order-sensitive applications.

Order-Sensitive Communications in Packet Reordering Networks

The techniques herein provide a method for handling packet reordering in Smart Grid AMI networks and other LLNs. In one aspect, a device may mark packets of a flow that is sensitive to reordering, such as packets associated with a DA application. In some cases, a policy may be downloaded to the network nodes, to inform the nodes of kinds of traffic that are sensitive to reordering. In other cases, one or more packets of the flow may be specifically marked as being order-sensitive. In another aspect, a device forwarding order-sensitive packets may maintain state about what route is being used for the flow and mark packets that take a different route as being potentially out-of-order. In a further aspect, another device (e.g., an egress router, etc.) receiving order-sensitive packets via different routes may buffer packets marked as being potentially out-of-order, in an attempt to reorder the packets prior to forwarding. In yet another aspect, the reordering device may also signal back to the source and/or to any intermediary devices to cause the devices to adjust their rerouting strategies, to minimize future packet reordering.

Illustratively, the techniques described herein may be performed by hardware, software, and/or firmware, such as in accordance with the "order-sensitive packet processing" process 248/248a, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as various routing protocols (e.g., RPL), and as such, may be processed by similar components understood in the art that execute those protocols, accordingly.

Specifically, according to various embodiments, a device in a network determines that a particular packet flow in the network is sensitive to packet reordering. The device determines whether a particular packet of the packet flow is to be routed differently than an immediately prior packet in the packet flow, in response to determining that the particular packet flow is sensitive to reordering. The device marks the particular packet as taking a different route than the immediately prior packet in the packet flow, prior to forwarding the marked packet and in response to determining that the particular packet is to be routed differently than the immediately prior packet in the packet flow.

Operationally, the techniques herein allow Smart Grid AMI mesh networks and other forms of LLNs in which packet reordering is common to support communications between DA devices. In particular, the techniques herein may involve having devices mark packets that are sensitive to reordering, additionally marking packets of a flow that use a different path than previous packets, and having a receiving device attempt to return the marked packets to their original ordering. In further embodiments, the reordering device may also inform the source of the packets and/or any intermediary nodes regarding the reordering, thereby allowing the nodes to adjust their rerouting policies if excessive packet ordering occurs.

Figure 5A:
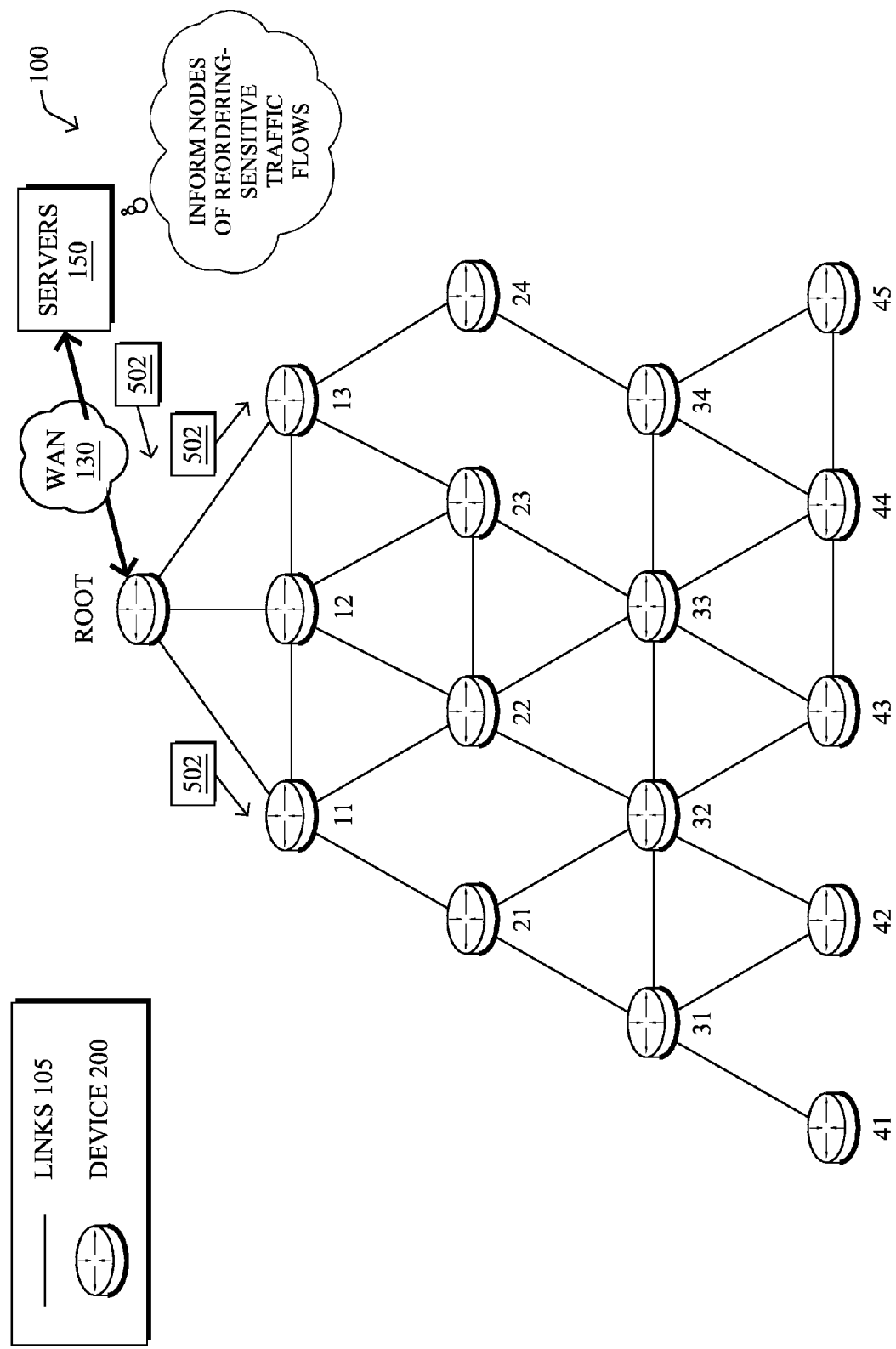
FIGS. 5A-5C illustrate examples of a packet flow being marked as being sensitive to packet reordering.
Figure 5B:
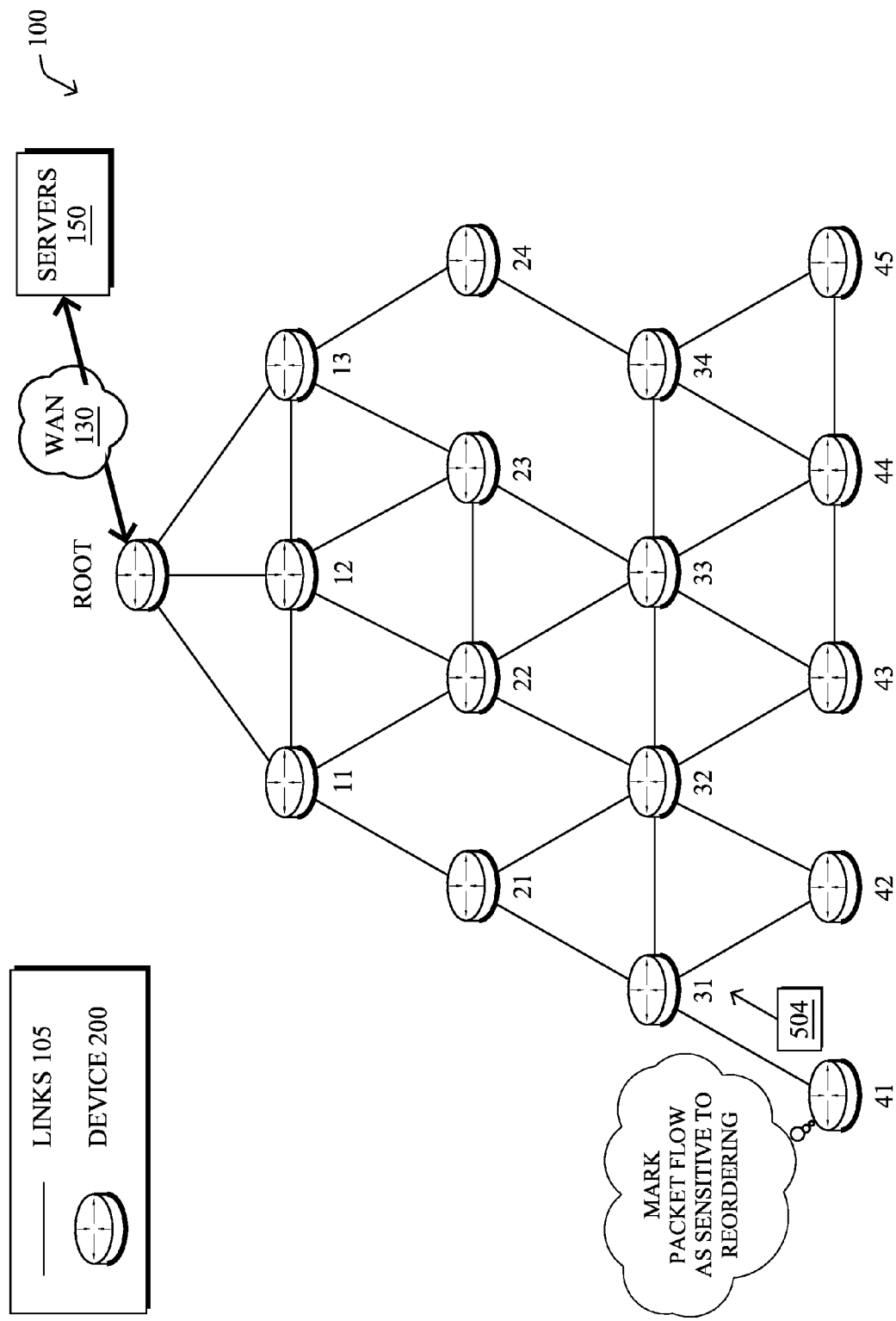
Figure 5C:
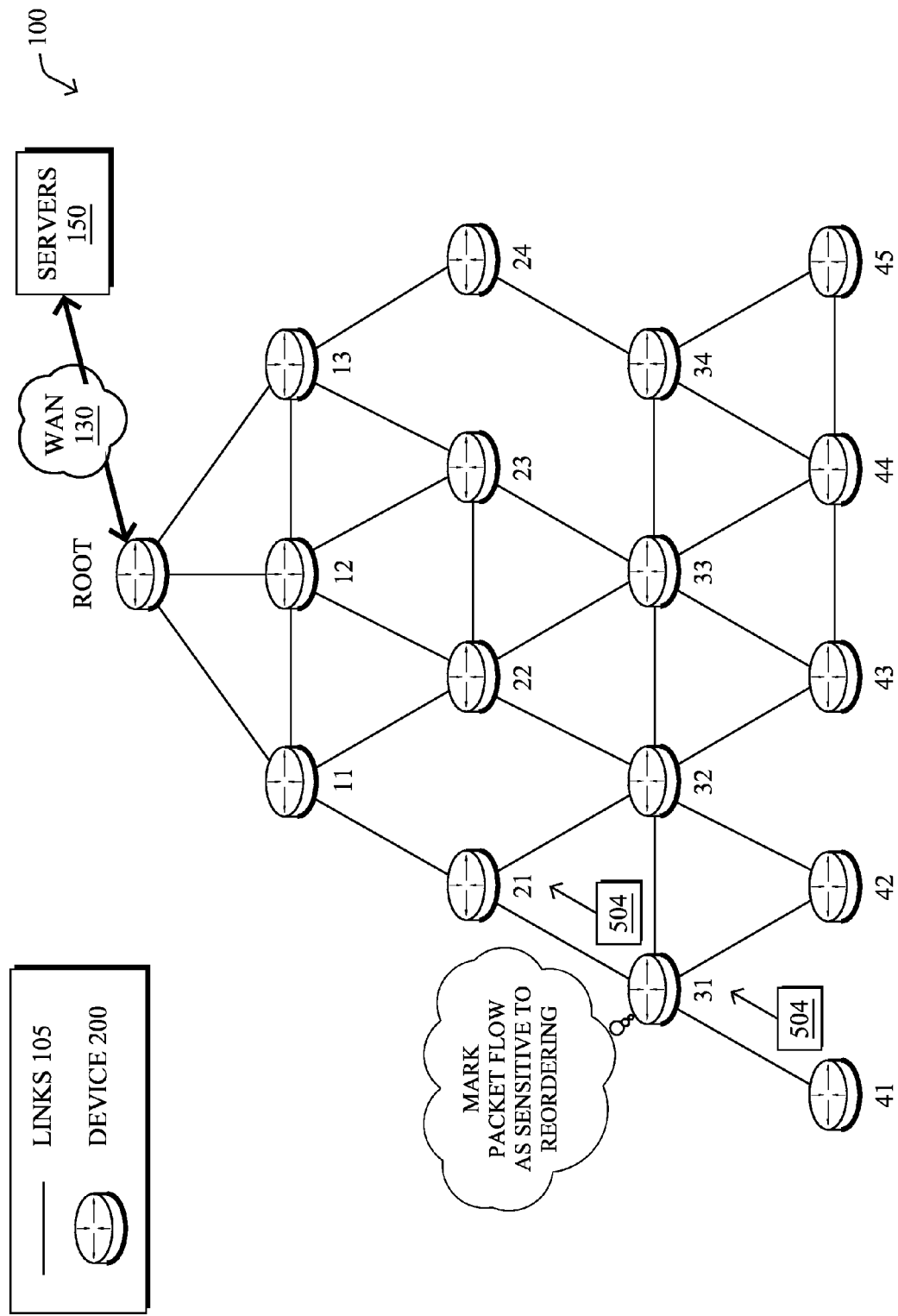

FIGS. 5A-5C illustrate examples of a packet flow being marked as being sensitive to packet reordering, according to various embodiments. A first aspect of the techniques herein involves marking packets of flows that are sensitive to packet reordering. In various embodiments, a policy may be downloaded dynamically to the devices/nodes in the LLN, thereby informing the nodes of the kinds of traffic that are order-sensitive (e.g., DNP3 traffic, etc.). For example, as shown in FIG. 5A, a supervisory device (e.g., one of servers 150, the FAR/Root, etc.) may send policies 502 to the various nodes/devices in network 100 that indicate the types of traffic that are sensitive to packet reordering. Policies 502 may include, for example, an indication of the traffic class values associated with the traffic, the UDP/TCP port values associated with the traffic, the network addresses of the devices that send or receive the order-sensitive traffic, etc. In one embodiment, policies 502 may be conveyed via a custom CoAP message obtained by a device during the network registration process.

Based on the received policies, LLN devices may mark any packet flows associated with an order-sensitive application as being order-sensitive. By marking individual packets as sensitive to reordering, LLN routers may selectively apply the techniques herein to packets they are sending or forwarding. In other words, LLN routers implementing the techniques herein may only need to maintain per-flow state for flows that are sensitive to reordering. Note that many Smart Grid AMI application protocols (e.g. C12.22, CSMP, etc.) are designed for LLNs and can handle packet reordering at the application layer. However, other SCADA protocols, such as DNP3, do not.

In one embodiment, the source of a packet flow may mark one or more of the packets in the flow as order-sensitive using a newly specified IPv6 header bit. For example, as shown in FIG. 5B, assume that device 41 is a DA device that generates and sends a packet flow 504 containing order-sensitive traffic (e.g., SCADA traffic sent towards a SCADA server in server 150, etc.). In such a case, device 41 may mark one or more of the packets in packet flow 504 as being sensitive to reordering. For example, when the DA device 41 is encapsulating DNP3 in IP packets, the DA device may mark the IP packet as being order-sensitive.

In another embodiment, an ingress router may mark the packet using a packet classifier. For example, as shown in FIG. 5C, assume that node 31 ingresses packets of packet flow 504 into the mesh on behalf of device 41. In such a case, node 31 may mark all IP packets received from device 41 and associated with a DNP3 port as being order-sensitive.

A packet flow that is sensitive to packet reordering may be marked as such in a number of different ways, regardless of which device marks the packet flow. In one embodiment, the marking may be encoded in an IPv6 Traffic Class header of one or more packets in the flow. In another embodiment, the marking may be encoded in a newly defined IPv6 Hop-by-Hop Option. In a further embodiment, for packets that do not have any ordering information (e.g., UDP packets, etc.), the marking may indicate a sequence number of the packet.

Figure 6A:
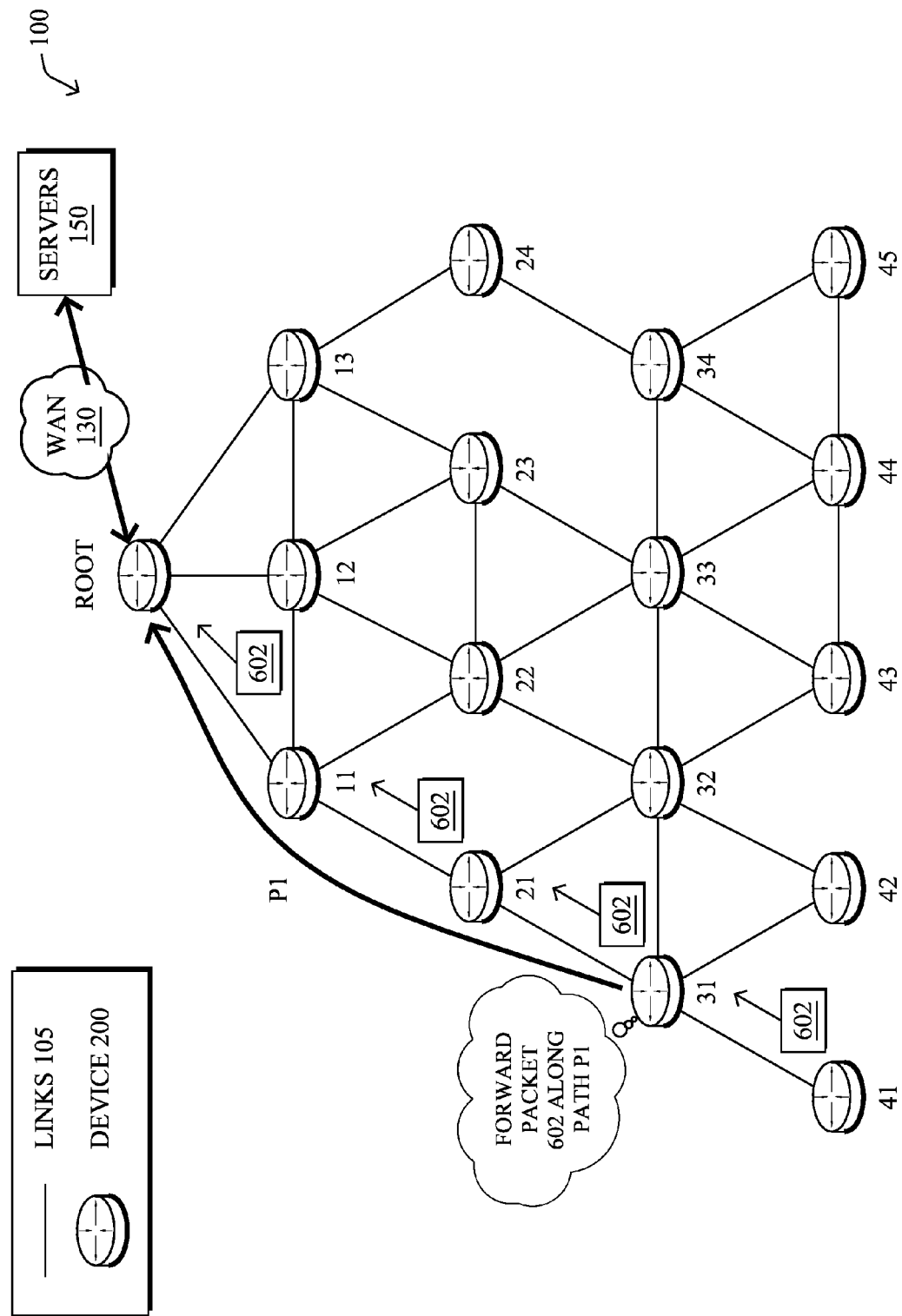
FIGS. 6A-6C illustrate an example of a packet being marked as having been sent along a different path than prior packets in the flow.
Figure 6B:
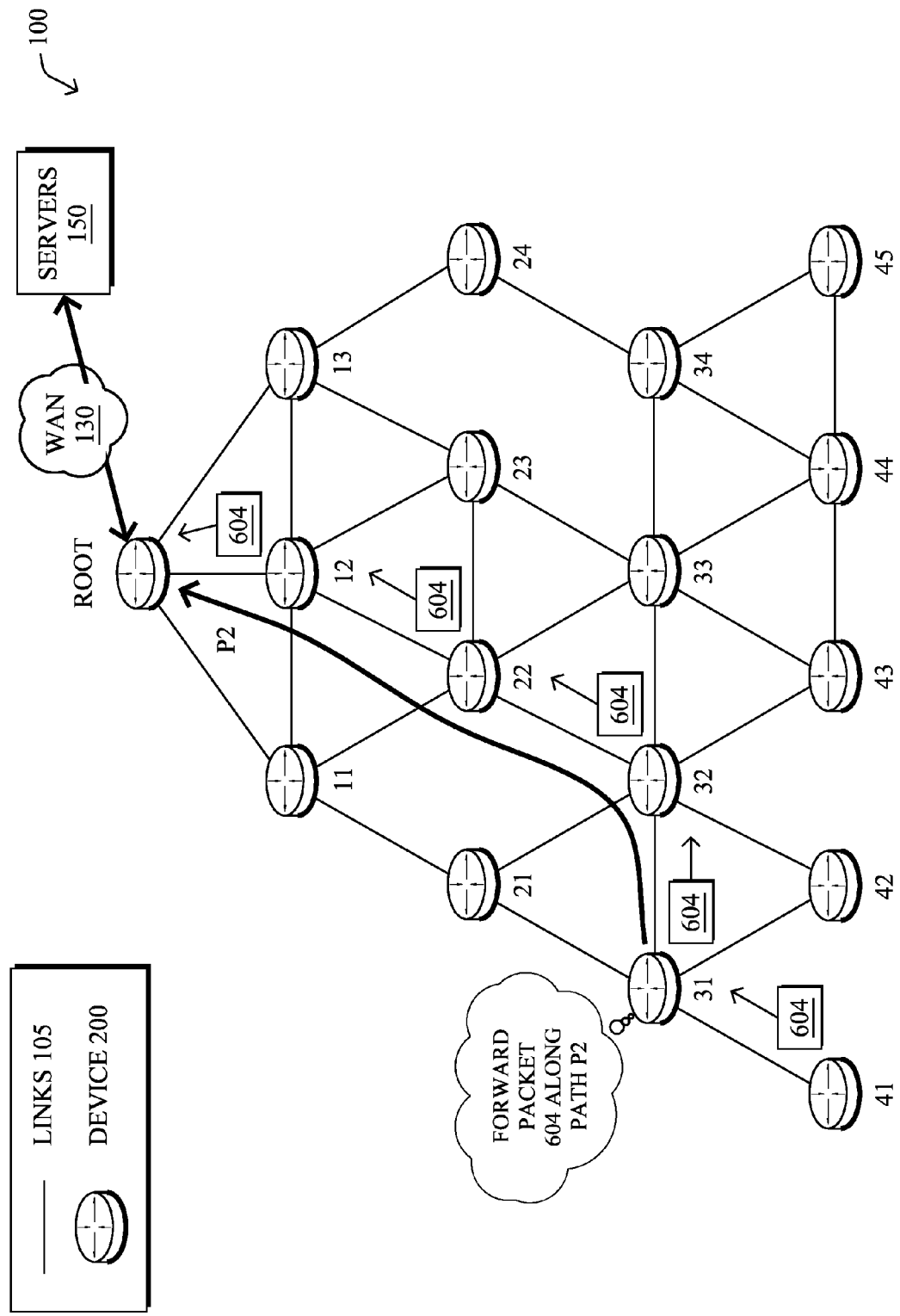
Figure 6C:
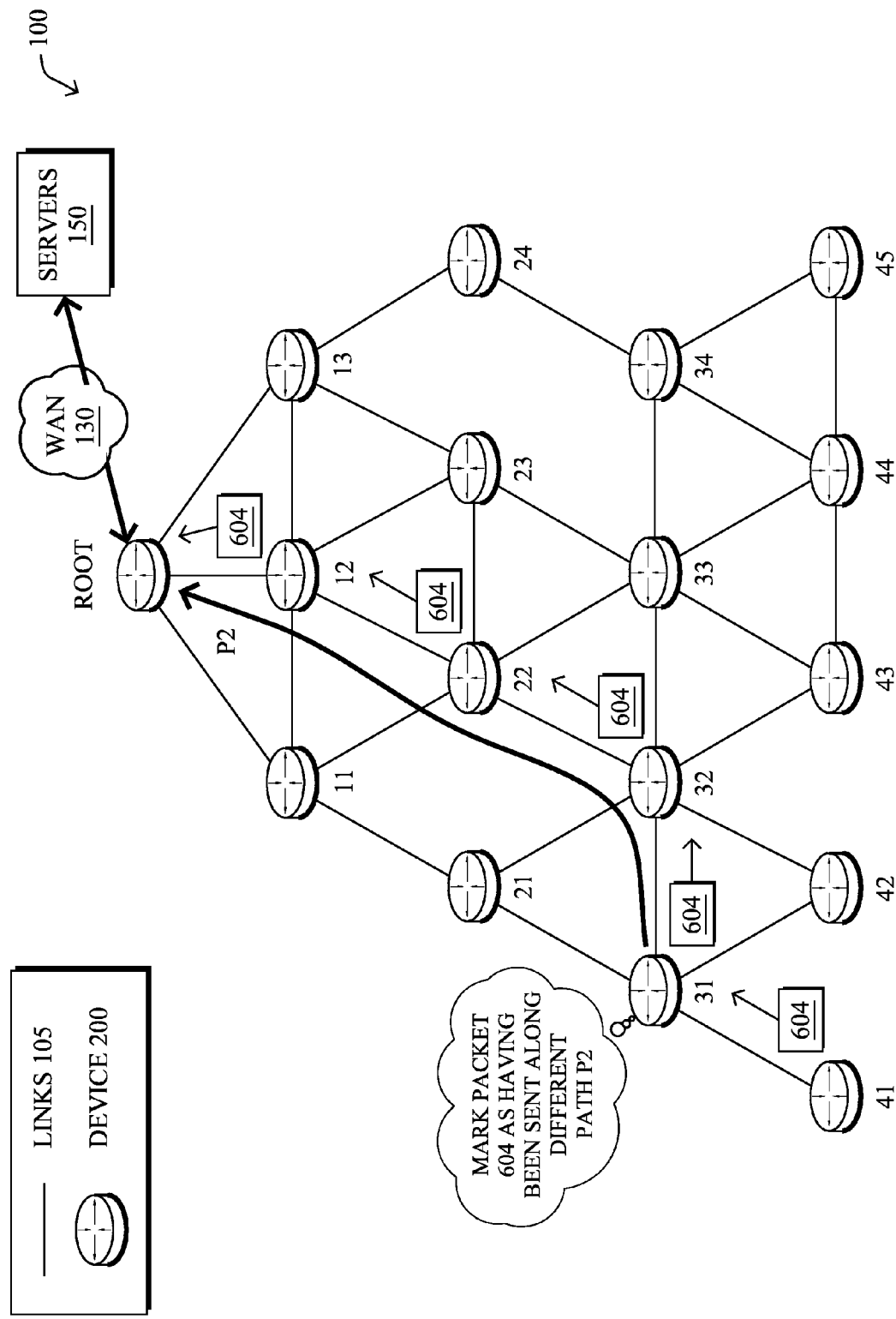

FIGS. 6A-6C illustrate an example of a packet being marked as having been sent along a different path than prior packets in the flow, according to various embodiments. In another aspect of the techniques herein, a router (e.g., any of the nodes/devices via which a packet flow is sent) may be operable to mark a packet that gets rerouted from the prior packet in the flow. For example, as shown in FIG. 6A, assume that node 31 routes a first packet 602 from node 41 (e.g., a packet in packet flow 504) along a path P1 that includes nodes 21, 11, and the FAR/Root. However, as shown in FIG. 6B, also assume that node 31 routes a subsequent packet 604 in the flow along a different path P2 towards the FAR/Root that includes nodes 32, 22, and 12.

An LLN router may select a different route when forwarding packets of a packet flow for any number of reasons. For example, node 31 may opt to forward packet 604 along path P2 if node 31 first attempted to send packet 604 to node 21 and did not receive a link-layer acknowledgement. In another example, node 31 may send packet 604 along path P2 in response to a routing topology update (e.g., due to a change in the network topology, a change in performance conditions, etc.). In yet another example, node 31 may send packet 604 along path P2 in conjunction with a load balancing mechanism in which multiple routing paths are used.

For any given packet flow, if all packets are routed the same way, no reordering will occur, so long as the LLN routers that forward the packets use a first-in, first-out (FIFO) policy. However, reordering may occur if an LLN device chooses to use a different route when routing packets of a given flow. Accordingly, in various embodiments, if an LLN device chooses to send a packet of the flow along a different path/route than a previous packet, the device may mark the packet to indicate that the packet has been rerouted. For example, as shown in FIG. 6C, node 31 may mark packet 604 as being routed along a different path than that of packet 602 (e.g., along path P2 instead of path P1). Such a marking may be made in a similar manner to those described above with respect to marking the packet flow as being order-sensitive (e.g., via an IPv6 Traffic Class header flag, via an IPv6 Hop-by-Hop option, etc.). In some cases, a routing node/device may only mark a packet that belongs to an order-sensitive flow as being routed along a different path, while leaving other re-routed packets unmarked.

Figure 7A:
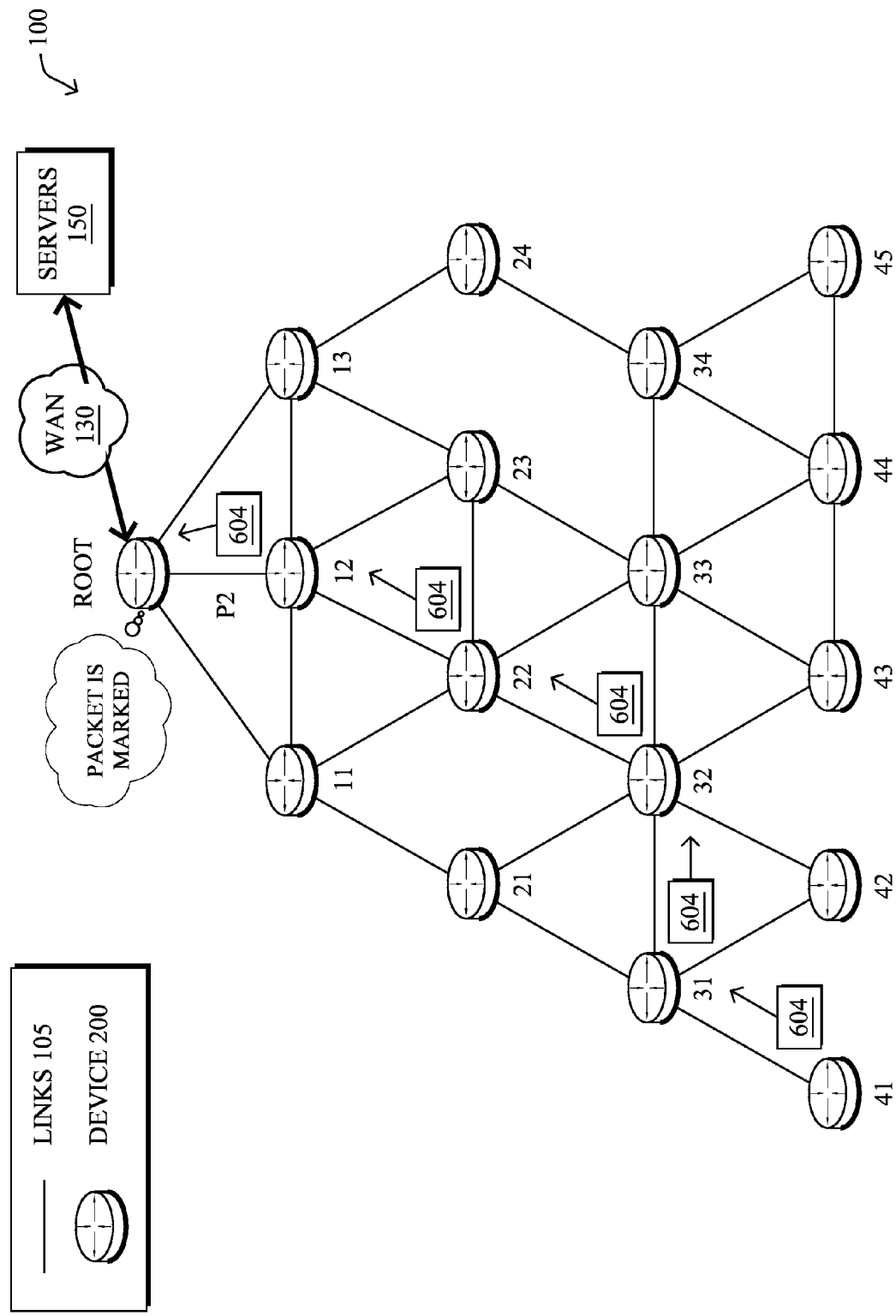
FIGS. 7A-7C illustrate an example of packets of a flow being forwarded in sequence.
Figure 7B:
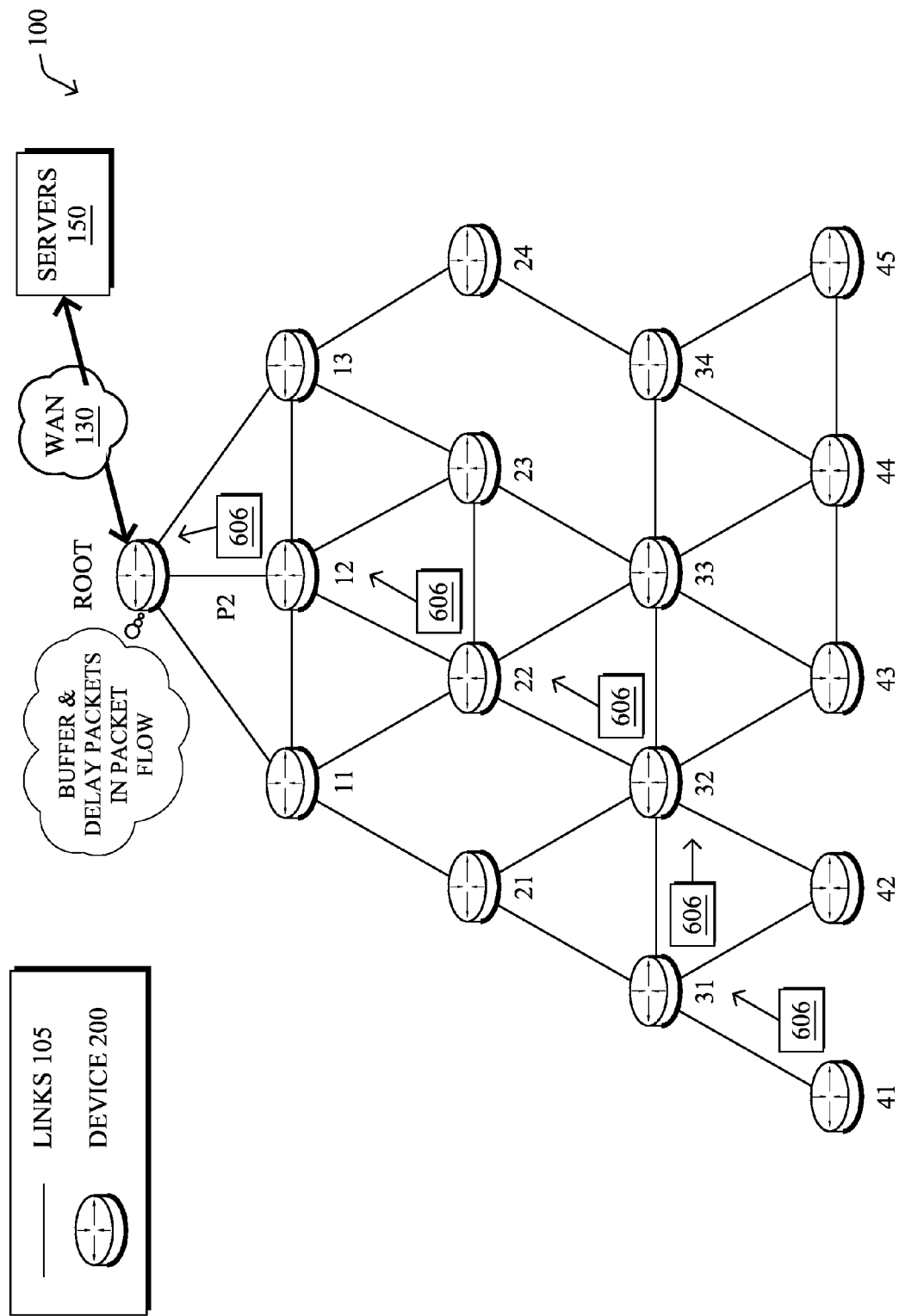
Figure 7C:
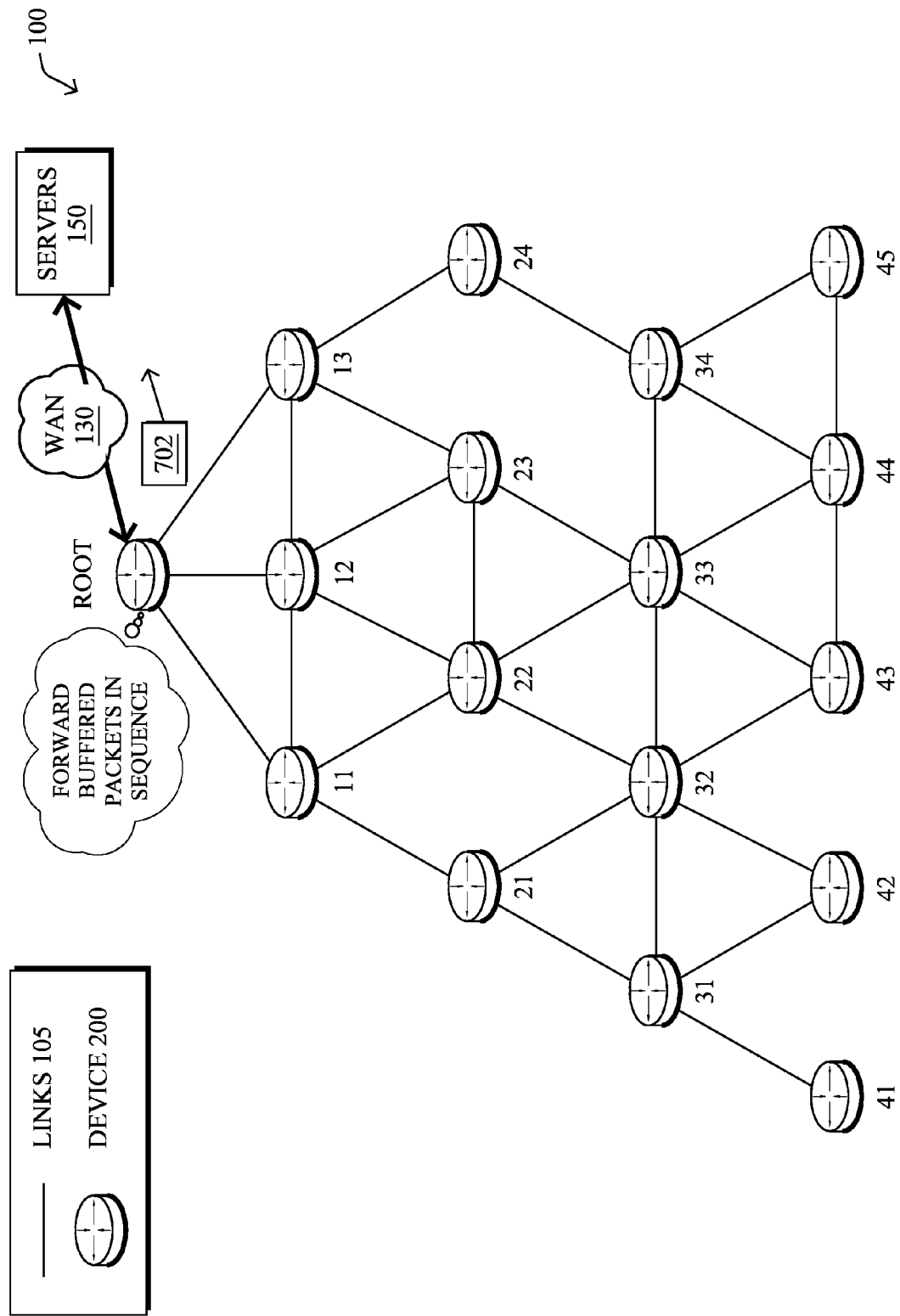

FIGS. 7A-7C illustrate an example of packets of a flow being forwarded in sequence, according to various embodiments. In some aspects of the techniques herein, having an LLN router mark a packet that takes a different route may signal to downstream routers that packet reordering may be needed. In various embodiments, a downstream router (e.g., an egress router, etc.) may perform corrective measures, when a packet of an order-sensitive packet flow is received out-of-order and marked as rerouted. For example, as shown in FIG. 7A, assume that the FAR/Root receives packet 604 that was previously marked by node 31 as having been routed along a different path than packet 602 and marked by node 41 as belonging to an order-sensitive traffic flow. In such a case, the FAR/Root may attempt to ensure that any packets of the flow that it receives are ordered correctly, prior to forwarding the packets to another device (e.g., a SCADA server in servers 150, etc.).

In various embodiments, a device that receives an out-of-order packet and marked as rerouted may buffer the packet and delay its forwarding for a period of time, to allow any earlier sent packets to arrive. For example, as shown in FIG. 7B, the FAR/Root may buffer packet 604 and delay its forwarding for some time, before forwarding packet 604 on to server 150. In one embodiment, the buffering device may wait for a threshold amount of time before forwarding on the buffered packet(s). In another embodiment, the buffering device may delay forwarding the marked packet until a threshold number of packets are received. For example, as shown, assume that packet 606 was sent by node 41 prior to packet 604, but reaches the FAR/Root after packet 604. In such a case, the FAR/Root may buffer both packets 604 and 606 and reorder the buffered packets back to their intended sequence. Then, as shown in FIG. 7C, the FAR/Root may forward the set 702 of buffered packets (e.g., packets 604, 606, etc.) according to their original sequence (e.g., to a SCADA server in servers 150, etc.).

In some embodiments, an egress router (e.g., the FAR/Root, etc.) may only buffer and delay an out-of-order packet that is marked as having been rerouted. In some cases, a packet in a packet flow may be skipped while using the same routing path for all packets, such as due to a packet drop. Accordingly, in one embodiment, a router or other device that receives an out-of-order packet that is not marked as having been rerouted may not buffer the packet and may still forward the packet immediately.

Figure 8A:
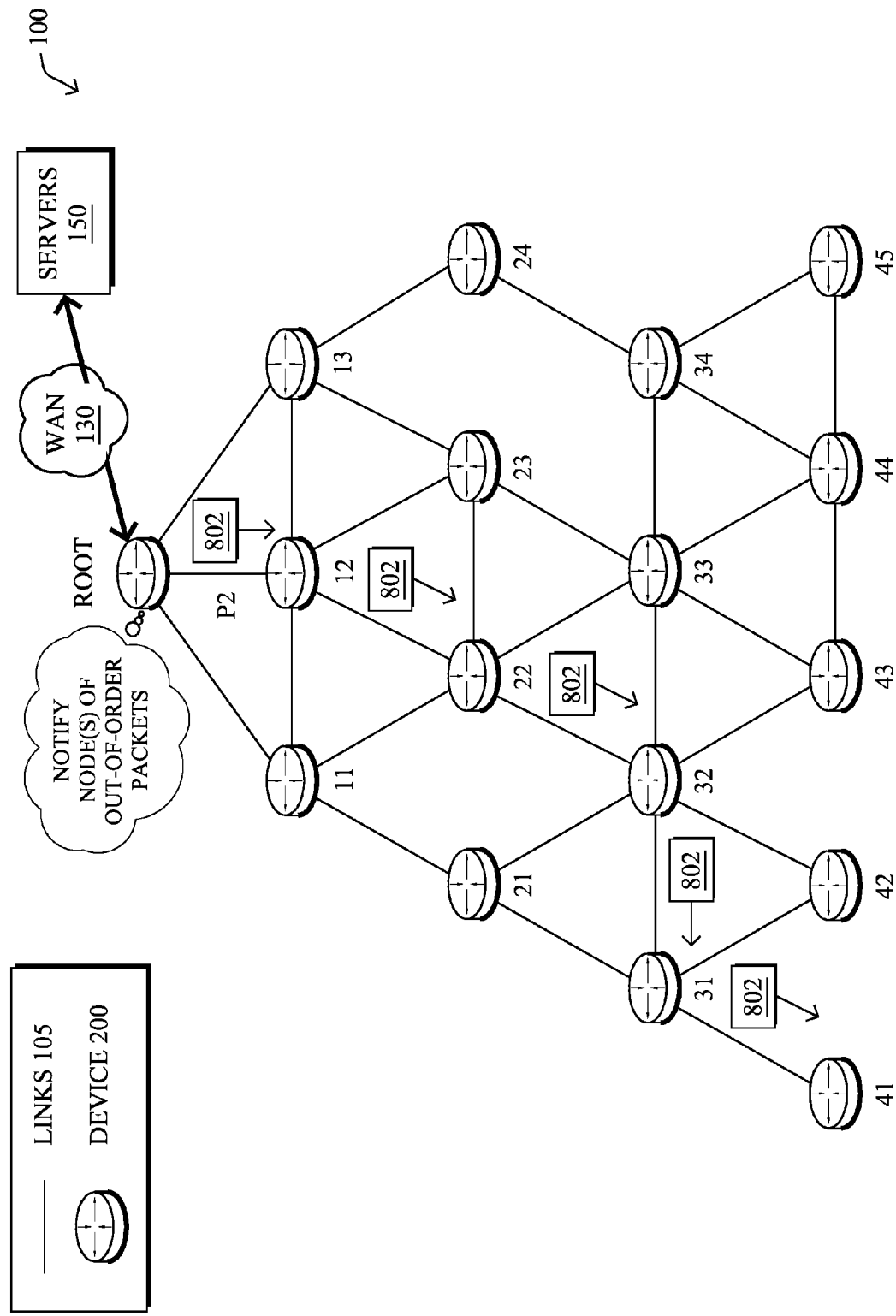
FIGS. 8A-8B illustrate an example of a rerouting strategy being adjusted.
Figure 8B:
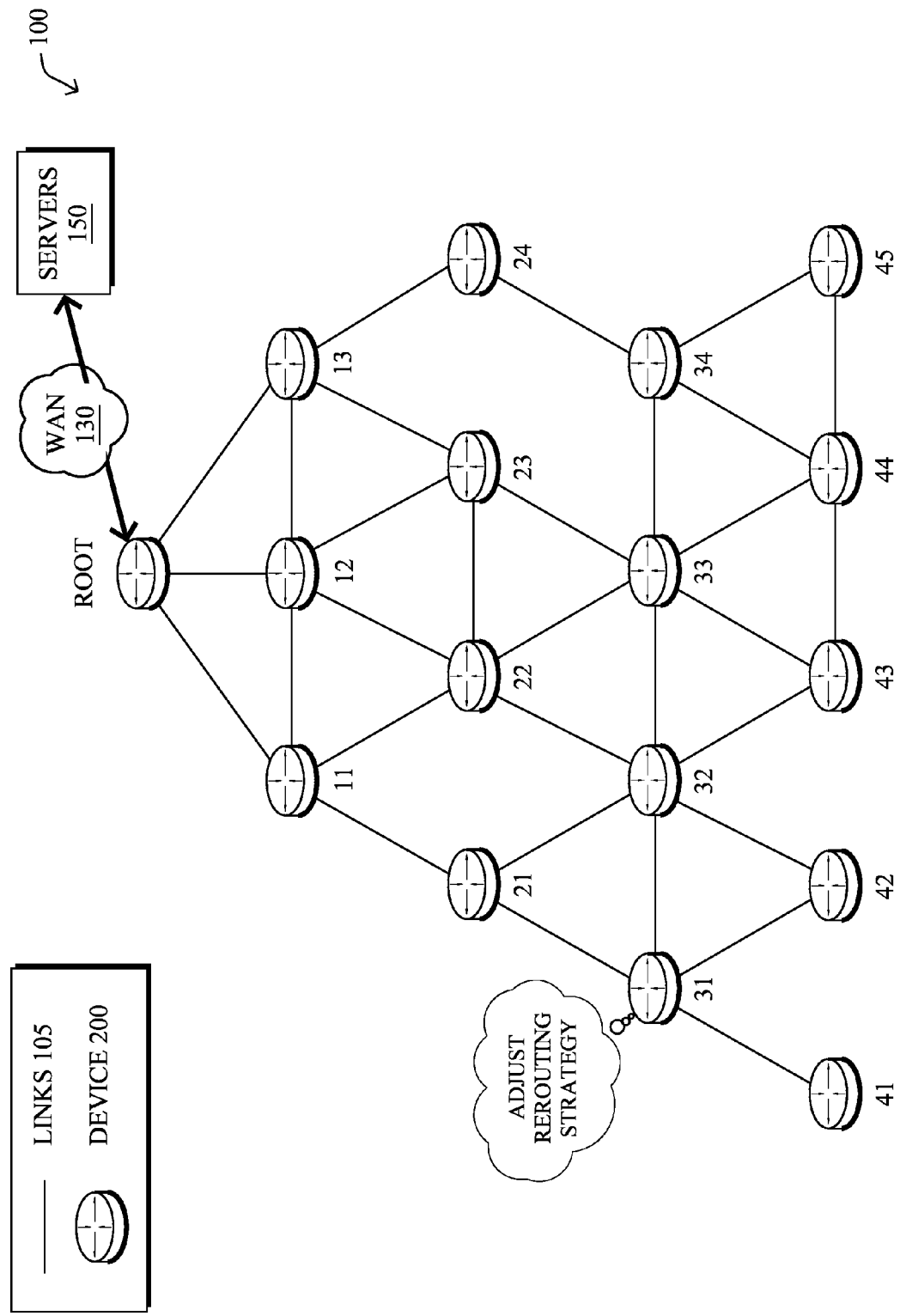

FIGS. 8A-8B illustrate an example of a rerouting strategy being adjusted, according to various embodiments. In some aspects of the techniques herein, an egress router or other device that is operable to buffer and delay the forwarding of order-sensitive packets may signal back to the source and/or any intermediate devices along a routing path when out-of-order packets are detected after a route change. Notably, in some cases, the rerouting strategy used by the source of the packet flow and/or any of the intermediary devices along the routing path may be causing the packets to be received out-of-order by the egress router or another downstream device. In response to such a signal from the downstream device, the source of the packet flow and/or any of the intermediary devices may adjust its rerouting strategy, so as to prevent further reordering.

As shown in FIG. 8A, assume that the FAR/Root receives a packet that was marked as having been rerouted (e.g., packet 604) and, accordingly, buffered and delayed the sending of packets of the packet flow for some time. If the FAR/Root receives out-of-order packets of the flow during this time, the FAR/Root may send a signal/indication 802 to the source of the flow (e.g., node 41) and/or to any of the intermediary nodes along the routing path (e.g., nodes 12, 22, 32, and 31). In general, signal/indication 802 indicates to these nodes that packet reordering was required and may correspond to a request to adjust the receiving device's rerouting strategy.

In one embodiment, signal/indication 802 may be piggybacked on an existing source routed packet in the reverse direction of the packet flow (e.g., using a data packet, if non-storing). In another embodiment, signal/indication 802 may be sent via a "dumb" (e.g., empty) source routed packet, to update the nodes along the path with the new policy.

In response to receiving one or more of signals/indications 802, the source of a packet flow and/or any intermediary devices along the routing path may adjust its rerouting strategy, as illustrated in the example of FIG. 8B. In one embodiment, if a particular node receives a threshold number of re-ordering notifications, it may adjust its rerouting strategy by stopping any load balancing of the order-sensitive traffic. In another embodiment, the particular node may adjust its rerouting strategy by making sure that the cost difference between different routing paths is as minimal as possible (e.g., by adjusting the acceptable delay, packet drops, or other metrics associated with its available routing paths).

Figure 9:
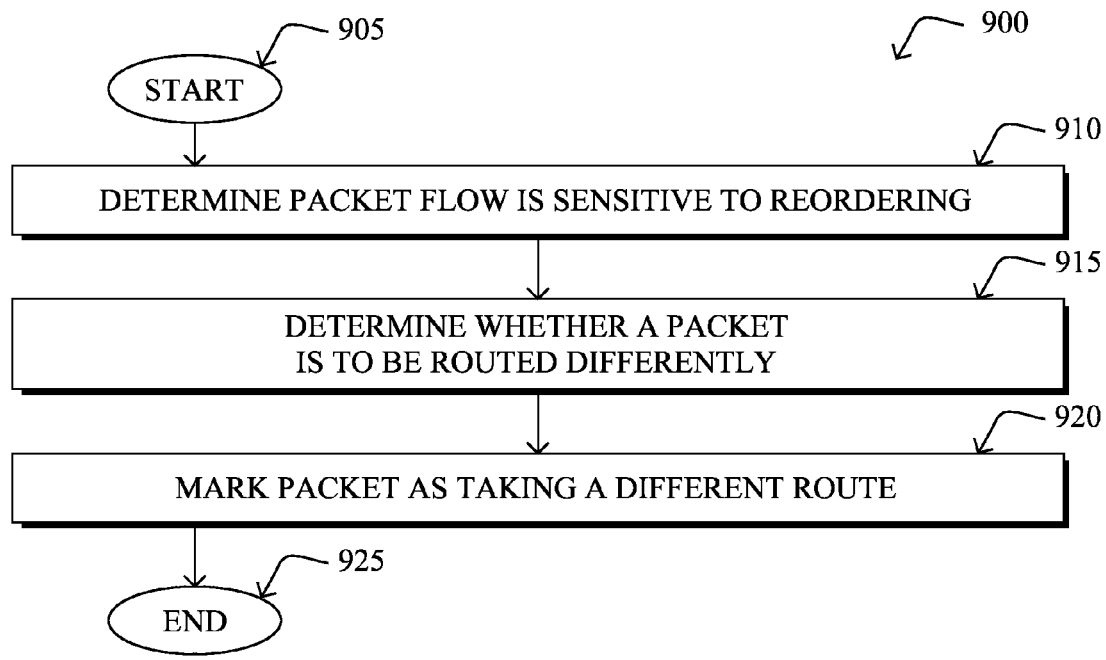
FIG. 9 illustrates an example simplified procedure for marking packets sensitive to packet reordering when routed differently than other packets in a flow.

FIG. 9 illustrates an example simplified procedure for marking packets sensitive to packet reordering when routed differently than other packets in a flow, in accordance with the embodiments herein. Procedure 900 may begin at step 905 and continues on to step 910 where, as described in greater detail above, a device in a network determines that a packet flow contains data that is sensitive to reordering. For example, in one embodiment, the device may determine that the packet flow contains DA data, such as data sent in accordance with SCADA protocol (e.g., DNP3, etc.). As noted previously, many LLN implementations support routing mechanisms that may lead to packets in a packet flow being received out-of-order (e.g., load balancing mechanisms, due to performance changes along a primary routing path, etc.). However, certain types of traffic routed through an LLN may not be able to tolerate packet reordering as well as other types of traffic.

The device may determine that the packet flow is sensitive to packet reordering in a variety of ways. In one embodiment, the device may receive a policy from a supervisory device (e.g., a policy engine, etc.) that indicates the types of traffic that are sensitive to packet reordering. In another embodiment, the device may determine that the flow is order-sensitive based on one or more packets in the flow being marked as sensitive to packet reordering. In various embodiments, a packet may be marked as order-sensitive via a set bit in a packet header, via a packet classifier that routes the packet, a set bit in a traffic class header, based on a port number or network address (e.g., an IPv6 address, etc.) associated with the packet, via a flow label associated with the packet, or via an IPv6 hop-by-hop option. In another embodiment, the packet may be marked as order-sensitive via a sequence number, if the packet is sent via a protocol that does not include ordering information (e.g., UDP).

At step 915, the device determines whether a packet in the packet flow is to be routed differently, as described in greater detail above. In particular, the device may determine whether a particular packet in the packet flow will be routed along a different path than that of its immediately prior packet in the flow. For example, assume that packet A is routed by the device along a first path. However, the device may determine that packet B which is next in the packet sequence should be routed along a second path (e.g., due to a device along the first path not acknowledging receipt of packet B, due to a routing topology change, etc.). In various embodiments, the determination may be made in response to determining that the packet flow itself is sensitive to reordering.

At step 920, as detailed above, the device may mark the particular packet as taking a different route than the immediately prior packet in the flow, prior to forwarding the particular packet. In one embodiment, the device may do so in response to determining that the packet belongs to an order-sensitive packet flow and that the packet is to be routed differently than the prior packet in the sequence. In various embodiments, the packet may be marked as taking a different route in a manner similar to a packet marking that indicates that the packet flow is order-sensitive (e.g., via an IPv6 Traffic Class header bit, etc.). Such information may be used by another downstream device (e.g., an egress router, etc.), to buffer and delay packets in the flow, to allow any potentially out-of-order packets in the flow to arrive. In some embodiments, as detailed above, the device may also receive feedback from a downstream device regarding any needed packet reordering and, in turn, adjust the rerouting strategy used by the device, to prevent packet reordering of the flow in the future. Procedure 900 then ends at step 920.

Figure 10:
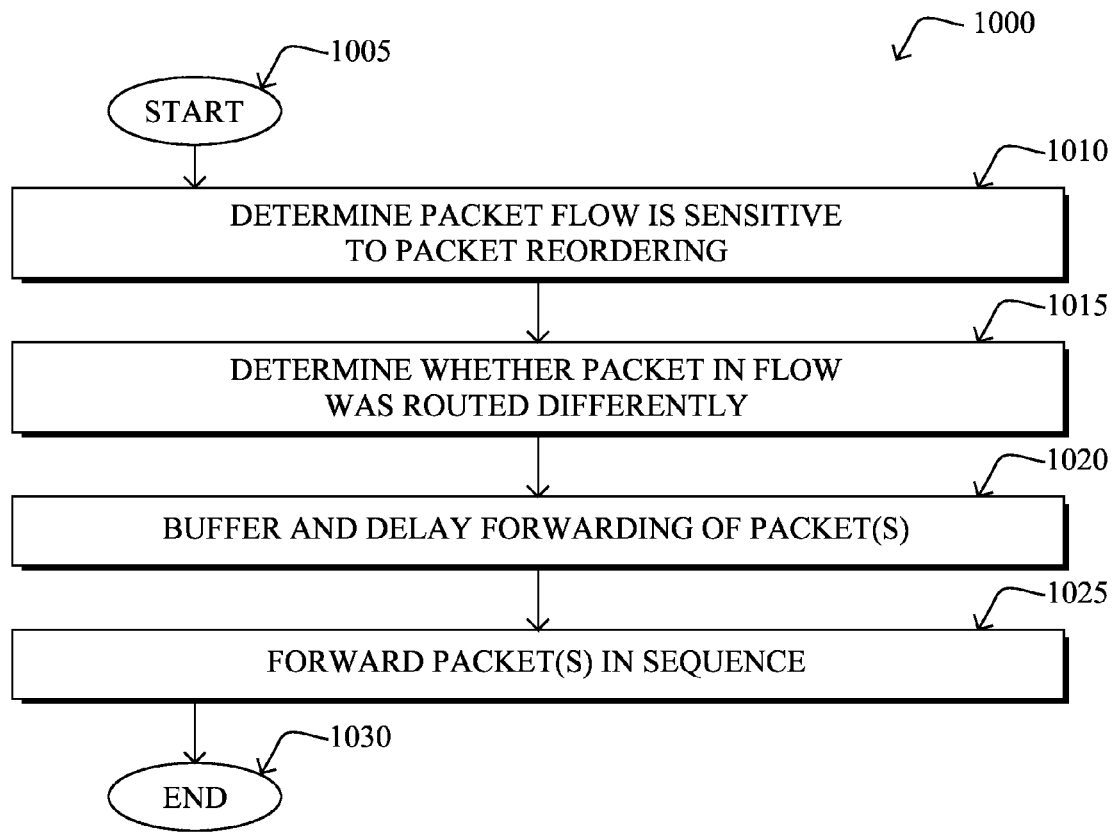
FIG. 10 illustrates an example simplified procedure for forwarding order-sensitive packets in sequence.

FIG. 10 illustrates an example simplified procedure for forwarding packets sensitive to packet reordering in sequence, according to various embodiments. Procedure 1000 may begin at step 1005 and continues on to step 1010 where, as described in greater detail above, a device in a network may determine that a packet flow is sensitive to reoffering. In general, procedure 1000 may be performed by a network device (e.g., device 200) that is downstream of a node that forwards or sends the packet flow (e.g., an egress router, etc.). The device may determine that the packet flow is sensitive to reordering based on a downloaded policy and/or based on any packet markings in the flow that indicate that the packets are order-sensitive.

At step 1015, as detailed above, the device determines whether a particular packet in the packet flow was routed differently. In particular, the device may determine whether the particular packet was sent along a different routing path than that of another packet in the flow (e.g., the packet sent immediately prior to the particular packet, etc.). In various embodiments, the device may make the determination based on a marking of the packet, such as, e.g., a set header bit/parameter of the packet, etc.

At step 1020, the device buffers and delays the forwarding of the particular packet and one or more other packets in the flow, as described in greater detail above. In general, the device may wait for one or more other packets of the flow to arrive, based on a determination that the particular packet was routed differently. In one embodiment, the device may buffer any packets of the flow that it receives for a set amount of time after receiving the particular packet. In another embodiment, the device may buffer the next n-number of packets that it receives after the particular packet.

At step 1025, as detailed above, the device forwards the particular packet and any of the other buffered packets of the flow in sequence. Notably, after buffering packets of the flow after receiving the particular packet, the device may re-order any out-of-order packets in the buffer, prior to forwarding the buffered packets. In some cases, the device may decapsulate the packet, prior to sending, such as when a message using one protocol is sent encapsulated in a message using a different protocol (e.g., a DNP3 message encapsulated in TCP or UDP packets, etc.). In some embodiments, the device may also provide a signal/indication to the source of the packet flow and/or any intermediary nodes used to forward the packets to the device regarding the re-ordering. In turn, the source and/or intermediary nodes may use this information to adjust their re-routing mechanism, to avoid packet reordering in the future. For example, the source or intermediary node may disable a load balancing mechanism, may impose a stricter degree of performance between different routing paths, or the like. Procedure 1000 then ends at step 1030.

It should be noted that while certain steps within procedures 900-1000 may be optional as described above, the steps shown in FIGS. 9-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 900-1000 are described separately, certain steps from each procedure may be incorporated into each other procedure, and the procedures are not meant to be mutually exclusive.

The techniques described herein, therefore, provide for order-sensitive communications in packet reordering networks. In particular, the techniques herein handle packet reordering in Smart Grid AMI networks and other LLNs, where minimizing packet reordering will help improve the performance of DA applications and other applications that may suffer from packet reordering issues. In the case of DA applications, out-of-order packets can lead to failed communication between DA devices, since serial bytes are assumed to arrive in order, leading to unnecessary retransmissions and application delays.

While there have been shown and described illustrative embodiments that provide for order-sensitive communications in packet reordering networks, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks and/or protocols. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as an apparatus that comprises at least one network interface that communicates with a communication network, a processor coupled to the at least one network interface, and a memory configured to store program instructions executable by the processor. Further, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   determining, by a device in a network, that a particular packet flow in the network is sensitive to packet reordering;
   wherein the device determines that the articular packet flow is sensitive to reordering based on a policy received from a supervisory device;
   determining, by the device, whether a particular packet of the packet flow is to be routed differently than an immediately prior packet in the packet flow, in response to determining that the particular packet flow is sensitive to reordering; and
   marking, by the device, the particular packet as taking a different route than the immediately prior packet in the packet flow, prior to forwarding, the marked packet and in response to determining that the particular packet is to be routed differently than the immediately prior packet in the packet flow.

2. The method as in claim 1, wherein at least one packet in the packet flow is marked as sensitive to reordering, and wherein the device determines that the particular packet flow is sensitive to reordering based on the at least one packet in the particular packet flow being marked as sensitive to reordering.

3. The method as in claim 2, wherein the at least one packet in the packet flow is marked as sensitive to reordering by one or more of: a set bit in a packet header of the at least one packet, a packet classifier that routes the at least one packet, a set bit in a traffic class header of the at least one packet, a port number associated with the at least one packet, a network address associated with the at least one packet, a flow label associated with the at least one packet, or an IPv6 hop-by-hop option.

4. The method as in claim 2, wherein the at least one packet is sent via a protocol that does not include packet ordering information, and wherein the at least one packet is marked as sensitive to reordering by an indicated sequence number.

5. The method as in claim 1, wherein the device determines that the particular packet is to be routed differently than the immediately prior packet in the packet flow based on at least one of: a failure to receive a link layer acknowledgement for the prior packet, a routing update, or a load balancing strategy used by the device.

6. The method as in claim 1, further comprising:
   receiving, at the device, an indication from a router in the network that the router received packets of the particular packet flow out of order.

7. The method as in claim 6, wherein the indication is piggybacked in a data packet sent in a direction opposite that of the particular packet flow.

8. The method as in claim 6, further comprising:
   adjusting, by the device, a routing strategy used by the device to route packet flows, in response to receiving a threshold number of indications from the router indicating that the router received packet flow packets out of order.

9. The method as in claim 8, wherein the device adjusts the routing strategy by stopping a load balancing mechanism used to balance path loads or by reducing a cost difference between two or more routing paths.

10. The method as in claim 1, wherein the device is an ingress router to the network.

11. The method as in claim 10, wherein the particular packet is received by the device via a first protocol, and wherein the method further comprises:
    encapsulating, by the device, the particular packet in a message according to a second protocol, prior to sending the particular packet.

12. A method comprising:
    determining, by a device in a network, that a particular packet flow is sensitive to packet reordering;
    wherein the device determines that the particular packet flow is sensitive to reordering based on a policy received from a supervisory device;
    determining, by the device, whether a particular packet of the packet flow received by the device is marked as having been routed differently than a previously received packet of the packet flow, in response to determining that the packet flow is sensitive to packet reordering;

buffering and delaying, by the device, the particular packet until either one or more out-of-order packets of the packet flow are received by the device subsequent to receiving the particular packet or upon expiration of a timeout period, in response to determining that the particular packet is marked as having been routed differently than the previously received packet of the packet flow; and forwarding, by the device, all buffered packets of the packet flow in sequential order.

13. The method as in claim 12, further comprising:
decapsulating, by the device, the particular packet, prior to forwarding the packet.

14. The method as in claim 12, further comprising:
providing, by the device, an indication to a router that forwarded the particular packet to the device that an adjustment to a rerouting strategy used by the router is requested, based on the buffering and delaying.

15. The method as in claim 14, wherein the indication is piggybacked in a data packet sent in a direction opposite that of the particular packet flow.

16. The method as in claim 12, further comprising:
forwarding, by the device, the particular packet immediately, in response to determining that the particular packet is not marked as having been routed differently than the previously received packet of the packet flow.

17. An apparatus, comprising:
one or more network interfaces to communicate with a segment routed network;
a processor coupled to the one or more network interfaces and configured to execute one or more processes; and
a memory configured to store a process executable by the processor, the process when executed operable to:
  determine that a particular packet flow in the network is sensitive to packet reordering;
  wherein the apparatus determines that the particular packet flow is sensitive to reordering based on a policy received from a supervisory device;
  determine whether a particular packet of the packet flow is to be routed differently than an immediately prior packet in the packet flow, in response to determining that the particular packet flow is sensitive to reordering; and
  mark the particular packet as taking a different route than the immediately prior packet in the packet flow, prior to forwarding the marked packet and in response to determining that the particular packet is to be routed differently than the immediately prior packet in the packet flow.

18. The apparatus as in claim 17, wherein the at least one packet in the packet flow is marked as sensitive to reordering by one or more of: a set bit in a packet header of the at least one packet, a packet classifier that routes the at least one packet, a set bit in a traffic class header of the at least one packet, a port number associated with the at least one packet, a network address associated with the at least one packet, a flow label associated with the at least one packet, or an IPv6 hop-by-hop option.

19. The apparatus as in claim 17, wherein the process when executed is further operable to:
receive an indication from a router in the network that the router received packets of the particular packet flow out of order.

20. The apparatus as in claim 17, wherein the process when executed is further operable to:
adjust a routing strategy used by the apparatus to route packet flows, in response to receiving a threshold number of indications from the router indicating that the router received packet flow packets out of order.

21. An apparatus, comprising:
one or more network interfaces to communicate with a segment routed network;
a processor coupled to the one or more network interfaces and configured to execute one or more processes; and
a memory configured to store a process executable by the processor, the process when executed operable to:
  determine that a particular packet flow is sensitive to packet reordering;
  wherein the apparatus determines that the particular packet flow is sensitive to reordering based on a policy received from a supervisory device;
  determine whether a particular packet of the packet flow received by the apparatus is marked as having been routed differently than a previously received packet of the packet flow, in response to determining that the packet flow is sensitive to packet reordering;
  buffer and delay the particular packet until either one or more out-of-order packets of the packet flow are received by the apparatus subsequent to receiving the particular packet or upon expiration of a timeout period, in response to determining that the particular packet is marked as having been routed differently than the previously received packet of the packet flow; and
  forward all buffered packets of the packet flow in sequential order.

22. The apparatus as in claim 21, wherein the process when executed is further operable to:
provide an indication to a router that forwarded the particular packet to the apparatus that an adjustment to a rerouting strategy used by the router is requested, based on the buffering and delaying.

23. The apparatus as in claim 21, wherein the process when executed is further operable to:
forward the particular packet immediately, in response to determining that the particular packet is not marked as having been routed differently than the previously received packet of the packet flow.

* * * * *